US009689371B2

(12) United States Patent
Daenekas et al.

(10) Patent No.: US 9,689,371 B2
(45) Date of Patent: Jun. 27, 2017

(54) METHOD AND ADHESIVE MACHINE FOR CONSTRUCTING SEGMENTED ROTOR BLADES

(71) Applicant: SGL CARBON SE, Wiesbaden (DE)

(72) Inventors: Kai Daenekas, Lemwerder (DE); Lars Weigel, Lemwerder (DE); Marcus Drewes, Lemwerder (DE)

(73) Assignee: Carbon Rotec GmbHH & Co. KG, Lemwerder (DE)

( * ) Notice: Subject to any disclaimer, the term of this patent is extended or adjusted under 35 U.S.C. 154(b) by 660 days.

(21) Appl. No.: 14/148,934

(22) Filed: Jan. 7, 2014

(65) Prior Publication Data
US 2014/0119935 A1   May 1, 2014

Related U.S. Application Data (63) Continuation of application No. PCT/EP2012/060667, filed on Jun. 6, 2012.

(30) Foreign Application Priority Data

Jul. 7, 2011   (DE) .......................... 10 2011 078 804

(51) Int. Cl.
*B32B 37/00* (2006.01)
*F03D 1/00* (2006.01)
(Continued)

(52) U.S. Cl.
CPC .............. *F03D 1/001* (2013.01); *B29C 65/48* (2013.01); *B29C 65/7802* (2013.01);
(Continued)

(58) Field of Classification Search
CPC ...... F03D 1/001; F03D 1/0675; F03D 1/0683; B29C 65/48; B29C 65/7802; B29C 65/7847; B29C 66/543; B29C 66/83221
(Continued)

(56) References Cited

U.S. PATENT DOCUMENTS 8,012,299 B2   9/2011 Hancock
8,262,361 B2   9/2012 Sanz Pascual et al.
(Continued)

FOREIGN PATENT DOCUMENTS

CN   102016297 A   4/2011
CN   102076473 A   5/2011
(Continued)

OTHER PUBLICATIONS

International Search Report of PCT/EP2012/060667, Dated Aug. 2, 2012.

*Primary Examiner* — James Sells
(74) *Attorney, Agent, or Firm* — Laurence A. Greenberg; Werner H. Stemer; Ralph E. Locher (57) ABSTRACT

An adhesive machine for constructing segmented rotor blades having at least three prefabricated rotor blade parts contains a first accommodating region for receiving a first prefabricated rotor blade part, a second accommodating region for receiving a second prefabricated rotor blade part and a third accommodating region for receiving a third prefabricated rotor blade part. The first accommodating region, the second accommodating region and the third accommodating region can be moved relative to each other so that, following successful receiving of the three prefabricated rotor blade parts in the proper accommodating regions in an open position of the adhesive machine, the rotor blade parts can be brought into direct or indirect contact with each other via predetermined adhesion regions and thus transferred into an adhesion position.

18 Claims, 5 Drawing Sheets

(51) Int. Cl.
    *B29C 65/78*    (2006.01)
    *F03D 1/06*    (2006.01)
    *F03D 13/10*    (2016.01)
    *B29C 65/02*    (2006.01)
    *B29C 65/52*    (2006.01)
    *B29C 65/00*    (2006.01)
    *B29L 31/08*    (2006.01)
    *B29C 65/48*    (2006.01)

(52) U.S. Cl.
    CPC ........ *B29C 65/7847* (2013.01); *B29C 66/543* (2013.01); *B29C 66/83221* (2013.01); *F03D 1/0675* (2013.01); *F03D 1/0683* (2013.01); *F03D 13/10* (2016.05); *B29C 65/02* (2013.01); *B29C 65/4835* (2013.01); *B29C 65/52* (2013.01); *B29C 66/721* (2013.01); *B29C 66/91231* (2013.01); *B29C 66/91421* (2013.01); *B29L 2031/085* (2013.01); *F05B 2240/302* (2013.01); *Y02E 10/721* (2013.01); *Y02P 70/523* (2015.11); *Y10T 156/10* (2015.01); *Y10T 156/1751* (2015.01)

(58) Field of Classification Search
    USPC .................................... 156/580, 581, 583.1
    See application file for complete search history.

(56) References Cited

U.S. PATENT DOCUMENTS

| 2011/0067795 | A1* | 3/2011 | Hancock ................. F03D 1/001 |
| | | | 156/60 |
| 2011/0100533 | A1 | 5/2011 | Kulenkampff et al. |
| 2011/0103962 | A1* | 5/2011 | Hayden ................. F03D 1/0675 |
| | | | 416/226 |
| 2012/0107129 | A1* | 5/2012 | Kulenkampff .......... B29C 65/52 |
| | | | 416/226 |

FOREIGN PATENT DOCUMENTS

| DE | 102004021389 A1 | 11/2005 |
| EP | 1965074 A2 | 9/2008 |
| WO | 2009109619 A2 | 9/2009 |
| WO | 2009130467 A2 | 10/2009 |
| WO | 2011006563 A2 | 1/2011 |

* cited by examiner

METHOD AND ADHESIVE MACHINE FOR CONSTRUCTING SEGMENTED ROTOR BLADES

CROSS-REFERENCE TO RELATED APPLICATION

This is a continuation application, under 35 U.S.C. §120, of copending international application No. PCT/EP2012/060667, filed Jun. 6, 2012, which designated the United States; this application also claims the priority, under 35 U.S.C. §119, of German patent application No. DE 10 2011 078 804.2, filed Jul. 7, 2011; the prior applications are herewith incorporated by reference in their entireties.

BACKGROUND OF THE INVENTION

Field of the Invention

The present invention relates to an adhesive machine or device for constructing segmented rotor blades containing at least three prefabricated rotor blade parts, rotor blades of this kind, and a method for their manufacture.

Rotor blades for wind power plants are most often made out of a laminate containing glass fiber materials and resins, wherein a number of planar glass fiber structures is typically infused with a suitable resin, so as to fabricate a composite material with the geometry of a rotor blade. In order to manufacture the large-scale rotor blades, the glass fiber structures are first placed in suitable molds, and treated with the resin therein. After heat treatment, the resin is cured, and the entire structure is cured.

A rotor blade here consists of a number of different components, which all must be laminated or adhesively bonded with each other so as to realize the overall structure of a rotor blade. In addition to the outwardly visible rotor blade shells, rotor blades further exhibit load-bearing belts and webs in their interior, which are adhesively bonded directly or indirectly with the inner surfaces of the rotor blade shells.

In order to fabricate the overall structure of a rotor blade, the individual components are adhesively bonded or laminated with each other. Rotor blade shells typically already provided with the belts and webs (pressure side and suction side) are here placed one atop the other, adhesively bonded and, once the adhesive has cured, the rotor blade is completed.

However, the manufacturing process, which is typically based on a 2-mold technology, does have limits in terms of the realizable rotor blade geometries. For example, undercuts and twisted blade geometries not only complicate the process of placing rotor blade half-shells on top of each other, but also markedly hamper the durable and loadable adhesive bonding of these locations as the geometry becomes more complex.

This fact proves disadvantageous in particular during the construction of novel rotor blade geometries, which are distinguished by a more intensively spiral, i.e., twisted geometry. In addition, numerous novel blade geometries, especially in the area of offshore wind energy, exhibit such rotor blades with complicated undercuts and relatively strong torsions.

SUMMARY OF THE INVENTION

As a result, there exists a technical necessity to propose an adhesive device making it possible to avoid the disadvantages from the prior art during the construction of rotor blades. In particular, the adhesive device should also permit the realization of rotor blade geometries that exhibit stronger torsions and undercuts by comparison to conventional blade geometries. In addition, the adhesive device should be suitable for reducing the manufacturing times for a rotor blade. A partially automated or even fully automated production of rotor blades should also be enabled. The object of the present invention is further to propose such a rotor blade, as well as a method for its manufacture.

In particular, these objects are achieved by an adhesive machine or device for constructing segmented rotor blades containing at least three prefabricated rotor blade parts, exhibiting: a first accommodating region for receiving a first prefabricated rotor blade part, a second accommodating region for receiving a second prefabricated rotor blade part, and a third accommodating region for receiving a third prefabricated rotor blade part. The first accommodating region, the second accommodating region and the third accommodating region can be moved relative to each other in such a way that, after the three prefabricated rotor blade parts have been received in the proper accommodating regions in an open position of the adhesive device, these rotor blade parts can be brought into direct or indirect contact with each other via predetermined adhesion regions, and thus transferred into an adhesion position.

Rotor blade parts are here also to be understood as rotor blade segments.

In addition, rotor blade part prefabrication is also intended to encompass curing, i.e., partial curing and/or complete curing. In particular, the rotor blade parts prefabricated in this way exhibit a glass transition temperature Tg of 50° C., which corresponds to a cross-linking of about 90%. By contrast, a largely completely cured rotor blade part here exhibits a glass transition temperature Tg of about 65° C. The glass transition temperature is typically measured via dynamic mechanical analysis (DMA) or dynamic differential scanning calorimetry (DSC).

The adhesion position is further distinguished by the fact that it represents a position suitable for adhesively bonding the rotor blade parts with each other. The adhesion position can here correspond with a closed position of the adhesive device, or also be a position that does not correspond with a closed position of the adhesive device, but with a position suitable for adhesive bonding.

In an especially preferred embodiment, the rotor blade parts are components accessible from outside on the completed rotor blade, i.e., they at least regionally exhibit an outer skin section. In particular, the rotor blade parts are not just belts or webs, whereas belts and/or webs can also be encompassed by the rotor blade parts.

In addition, the adhesion regions on the rotor blade are at least regionally visible from outside after its manufacture, i.e., at least one adhesion seam is visible from outside. In particular, the adhesion regions do not relate to adhesions on the components, for example the belt or web, that are no longer visible or accessible from outside following completion of the rotor blade.

The objects of the invention are further achieved by a method for adhesively bonding several, in particular three, prefabricated rotor blade parts for constructing a segmented rotor blade. The rotor blade parts are adhesively bonded by an adhesive device in such a way that at least one of the rotor blade parts, preferably all three rotor blade parts, are accommodated by the adhesive device, and brought into direct or indirect contact with another rotor blade part via predetermined adhesion regions so as to be adhesively bonded in an adhesion position.

Further objects of the invention are achieved by a rotor blade essentially fabricated out of a fiber-reinforced material. The rotor blade exhibits at least two separate adhesion regions, at which prefabricated rotor blade parts are adhesively bonded with each other to form a rotor blade.

Such an adhesive device along with the corresponding method for manufacturing such rotor blades make it possible to adhesively bond a plurality of prefabricated rotor blade parts with each other in a suitable manner, so as to realize a rotor blade geometry distinguished by torsions and undercuts that cannot be produced otherwise at the present time. Specifically, because the rotor blade parts are manufactured not just out of two half shells, the individual rotor blade parts can be prefabricated with the kind of geometry that distinctly facilitates the subsequent process of joining and adhesively bonding the individual rotor blade parts. As a result, even those rotor blade parts exhibiting an enhanced torsion or an undercut can be prefabricated without already having being joined with another rotor blade part.

According to the invention, the manufacturing method or adhesive device enables a departure from the previous 2-half shell fabrication method, thereby making it possible to manufacture rotor blades with complex geometries.

As a result, such a manufacturing method and adhesive device according to the invention permits the manufacture of so-called multi-segment blades, which are additionally distinguished by larger dimensions than conventional rotor blades previously known from prior art, as well as by a higher number of possible geometric configurations. The adhesive device according to the invention also diminishes the amount of work involved in adhesively bonding such rotor blades, thereby enabling an accelerated production from the time of adhesive bonding to the time of rotor blade completion. In addition, the adhesive device also permits suitable component positioning, so that even more complex rotor blade geometries can be realized. Furthermore, the amount of logistical work preceding manufacture is diminished, specifically because the rotor blades to be transported are relatively smaller in terms of their dimensions.

A first, especially preferred embodiment of the adhesive device provides that the adhesive device exhibit at least one additional, fourth accommodating region, which is configured to receive or mount a flange, which in particular can be adhesively bonded with at least one of the three prefabricated rotor blade parts over a predetermined adhesion region. This ensures that an entire rotor blade with flange for connection to the hub of a wind power plant can be fabricated in accordance with the embodiment. In addition, the fourth accommodating region ensures a controlled manipulation of the flange, so as to achieve a desired alignment and exact relative positioning of the rotor blade parts to the flange. Furthermore, separately accommodating the flange in a region not provided for receiving other relatively lighter rotor blade parts can improve weight distribution, making it possible to diminish the overall technical outlay for the adhesive device.

Another embodiment of the adhesive device according to the invention can provide for the automatic and/or course controlled transfer of the prefabricated rotor blade parts arranged in the three accommodating regions into the adhesion position. This makes it possible to manufacture a finished rotor blade more quickly on the one hand, while also enabling series production for relatively high throughput rates. In addition, the accuracy and precision with which the rotor blade parts are adhesively bonded with each other can also be elevated by a course controller. Furthermore, the positioning and repetition accuracy are distinctly improved.

The embodiment can further provide that the first accommodating region, the second accommodating region and the third accommodating region can be moved in such a way when transferring the prefabricated rotor blade parts arranged in the three accommodating regions that the prefabricated rotor blade parts can be brought into direct or indirect contact with each other for adhesive bonding purposes essentially at the same time, but in particular at a time offset not to exceed 30 minutes. This once again enables a relatively faster manufacture of a finished rotor blade, and ensures the foundation for series production. In particular, this also allows the realization of a 12-hour cycle for rotor blade manufacture, since joining the rotor blade parts in immediate chronological succession reduces the time required for completing a rotor blade.

Another embodiment of the adhesive device according to the invention provides that at least one of the four accommodating regions can be tilted relative to one of the other accommodating regions while transferring the prefabricated rotor blade parts situated in the four accommodating regions into the adhesion position. As a consequence, undercuts that could previously not be manufactured can be realized, enabling the construction of even more complex blade geometries. In particular, the blade angles can be individually adjusted while tilting.

Another embodiment of the invention provides that the first accommodating region, the second accommodating region and the third accommodating region execute a movement relative to each other that is perpendicular to the progression of the gravitational field while transferring the prefabricated rotor blade parts situated in the three accommodating regions into the adhesion position. The relative movement is hence essentially horizontal, wherein this horizontal movement causes the three rotor blade parts to move relative to each other and into an adhesion position in such a way that the rotor blade parts to be adhesively bonded can be easily monitored and controlled by the operating personnel before, during and even after having moved into the adhesion position. In addition, a horizontal movement requires less expended force, and hence energy, than a movement exhibiting a vertical movement component. As a result, this ensures essentially low energy consumption in comparison to other movement orientations. Alternatively, the movement can also take place parallel to each other, wherein this yields the corresponding disadvantages.

Another possible embodiment provides that the flange arranged or mounted in the fourth accommodating region remains stationary and immovable while transferring the prefabricated rotor blade parts situated in the first, second and third accommodating regions into the adhesion position. On the one hand, this enables a more accurate relative positioning of the flange in relation to the rotor blade parts, since a movement of the relatively heavier flange region can be avoided. In addition, this also simplifies the overall manufacturing method, since only the movements, and hence the relative positioning, of the rotor blade parts in relation to a fixed reference system (specifically that of the flange) must be taken into account. In addition, the position of the flange is typically preadjusted, so that arranging all rotor blade parts relative to the flange simplifies the overall alignment and precise arrangement of the rotor blade parts to each other. These advantages can also be noted with respect to an alternative embodiment, in which the flange is already rigidly joined with one of the at least three rotor blade parts.

Another preferred embodiment can also provide that the first accommodating region, the second accommodating region and the third accommodating region be arranged in such a way relative to each other that, after the prefabricated rotor blade parts situated in the three accommodating regions have been transferred into the adhesion position, either the suction side or pressure side of the segmented rotor blade to be constructed is oriented essentially parallel to the progression of the earth's surface on which in particular the adhesive device is erected. This facilitates an optically assisted adjustment of the individual rotor blade parts. In addition, the individual rotor blade parts can be suitably propped against the floor without having to worry about damage to the rotor blade parts or a change in their relative alignment.

Another embodiment of the adhesive device can also provide that at least one of the three accommodating regions be pivotable in design, in particular so that it can pivot by at least 90°. As a result, adhesive regions of the individual rotor blade parts can be made accessible to the operating personnel, which could otherwise only be reached with difficulty. As a result, specific rotor blade parts can be changed in terms of their position for the required application of adhesive, and then be returned to a single alignment with other rotor blade parts again for adhesive bonding. Pivoting can take place not just for applying an adhesive, however, but also for filling the receptacles of the adhesive device with the corresponding, prefabricated rotor blade parts. It here proves especially advantageous for a pivoting position to release one of the receptacles toward the top, opposite the direction of gravity.

Another embodiment can envisage that at least one of the accommodating regions be adjustable to a geometric shape of the prefabricated rotor blade part or flange provided as intended for accommodation. As a result, the adhesive device can also be used for manufacturing rotor blades with a deviating geometry. In particular, the respective receptacles for accommodating the rotor blade part are provided with inserts, which adjust or correspond to the geometry of the rotor blade part. If the objective is now to change the geometry of the rotor blade part, all that need be done is to change out these inserts so as to provide receptacles that also correspond to the new geometry. Alternatively, the inserts can also be correspondingly deformed, and thereby adjusted, by suitably applied actuators. According to the embodiment, this expands the variety of uses for the adhesive device.

Another embodiment of the adhesive device according to the invention also envisages that the first accommodation region be provided for receiving a prefabricated nose shell and/or the second accommodating region for receiving a prefabricated middle part segment and/or the third accommodating region for receiving a prefabricated rear edge segment of the rotor blade to be constructed. In particular, these rotor blade parts are adhesively bonded with each other in such a way that their adhesion regions are largely arranged or run in the longitudinal direction of the rotor blade to be manufactured. In addition, the area of the rotor blade referred to as the nose region exhibits a sometimes enhanced curvature and torsion. This also holds true especially for the area referred to as the rear edge of the rotor blade. As a result, in order to diminish or avoid problems during manufacture and subsequent joining, rotor blade parts that encompass these regions are prefabricated, and subsequently only adhesively bonded in a suitable manner. Adhesive bonding can here take place in adhesion regions that are better suited for a solid adhesive bond than the sometimes curved regions in the nose area as well as the rear edge area.

The embodiment can also provide that at least one of the first, second or third accommodating regions of the rotor blade to be constructed exhibit a longitudinal extension, which is essentially oriented parallel to the longitudinal extension of the rotor blade to be constructed. The longitudinal extension of the rotor blade here stretches from the flange of the rotor blade to the blade tip. In addition, the adhesive device according to the embodiment exhibits one or more receptacles whose geometric extension exhibits a direction of expansion that differs from the others in that it is at its maximum size. In terms of the embodiment, this is intended as the direction of longitudinal extension for the receptacle. Alternatively, the accommodating regions can also exhibit a longitudinal extension that runs perpendicular to the direction of longitudinal extension for the rotor blade to be constructed, or at a predetermined angle thereto.

Another embodiment can further provide that the adhesive device exhibit an adhesive apparatus, which can at least section ally move along the predetermined adhesion regions, in particular perpendicular to the directional progression of the earth's magnetic field along the predetermined adhesion regions. The adhesive apparatus makes it possible to apply the required adhesive onto the adhesion regions before joining together the rotor blade parts. Given the size of the rotor blade parts and corresponding adhesion regions, large quantities of adhesive must be applied, which according to the embodiment is applied with the adhesive apparatus for reasons of time and production efficiency. Adhesive application can involve human assistance, or be completely automated.

A further development of this embodiment can also provide that the adhesive apparatus be suitable for receiving at least one person, who can effect or monitor the application of adhesive on the predetermined adhesion regions of at least one of the prefabricated rotor blade parts. The at least one person ensures a suitable application of adhesive on the adhesion regions. He or she either uses a suitable device for applying the adhesive onto the required adhesion regions, or simply monitors the application of adhesive given an automatically or semi-automatically operating device. In particular, the adhesive apparatus also exhibits enough space for storing the adhesive. The adhesive used can be a conventional industrial adhesive, in particular an epoxy adhesive.

In addition, the adhesive apparatus can also move in the direction of longitudinal extension of the rotor blade to be constructed. As a consequence, adhesive is applied especially efficiently in particular when the rotor blade parts exhibit a direction of longitudinal extension essentially corresponding to the direction of longitudinal extension of the rotor blade to be manufactured, i.e., the adhesion regions also run in this direction of longitudinal extension.

The adhesive apparatus can also be distinguished by the fact that the adhesive apparatus is suitably configured for automatically applying adhesives to predetermined adhesion regions of at least one of the prefabricated rotor blade parts or the flange. Such an automatic application can occur by having the adhesion regions exhibit a suitable marking that can be detected by an optical recognition device and correspondingly supplied with adhesive. Alternatively, such an automatic application can also involve detecting and storing the scope and local positions of the adhesion areas in advance, and having the adhesive apparatus enable the application of adhesive based upon this stored information.

Another embodiment of the adhesive device can also provide that the adhesive device exhibit at least one tempering device, which is configured in such a way as to expose predetermined adhesion regions of at least one of the prefabricated rotor blade parts or the flange to heat on a locally limited basis. Such a tempering device can exhibit a resistance heater with metallic resistance heating wires. The latter can also be laminated into predetermined components, in particular into inserts of the accommodating regions for the prefabricated rotor blade parts. Such resistance heating fields can measure 1-2 $m^2$ in size, and be individually or separately actuated. Also provided for temperature regulation are temperature sensors. The geometry of the tempering device here essentially corresponds to the progression of the adhesion regions, wherein other prefabricated and already cured regions of the rotor blade parts are not supplied with thermal energy. This tangibly economizes on energy primarily by comparison to such adhesive devices, since the entire rotor blade to be manufactured is not supplied with thermal energy.

The adhesive device can further also exhibit at least one pressing unit, which is configured in such a way as to be able to press one or more belt ends of the prefabricated rotor blade parts against the flange for purposes of adhesive bonding. Above all, such a pressing unit enables a targeted connection of the rotor blade part and flange. According to the embodiment, the rotor blade part exhibits belts that are situated on the inside after the rotor blade has been completely finished. Alternatively, however, any other suitable region of one or more rotor blade parts can also be pressed against the flange. In addition, such a pressing unit can also encompass a tempering device.

Furthermore, the adhesive device can also exhibit at least one suction unit, which makes it possible to retain at least one of the rotor blade parts in the respective accommodating region under a vacuum. To this end, the adhesive device can exhibit aspiration ports in the respective accommodating regions, which interact with at least one suction pump, and establish a vacuum between the prefabricated rotor blade part and the accommodating region. This type of retainer leaves no damage behind on the surface of the rotor blade part, and is thus particularly well suited for mounting purposes.

Another embodiment of the method according to the invention for manufacturing a rotor blade can also provide for a course-controlled transfer of the rotor blade parts into the adhesion position. As already explained above, this enables a chronologically improved and more precise fabrication of the rotor blade. Course control preferably takes place with an accuracy of at least 1 cm, in particular of 0.5 cm, and preferably of at least 3 mm. As a consequence, the adhesion regions of the rotor blade parts can be positioned relative to each other precisely enough to ensure the required dimensional accuracy of the rotor blade.

A preferred embodiment of the rotor blade according to the invention provides that at least two adhesion regions at least sectionally run in the direction of longitudinal extension of the rotor blade. On the one hand, this ensures that loads arising with a wind power plant in operation can be suitably distributed over the adhesion regions, thereby leaving no stress peaks to be expected in the adhesion regions. The situation would be different if the rotor blades had rotor blade parts that were adhesively bonded in such a way that the adhesion regions essentially run perpendicular to the direction of longitudinal extension of the rotor blade. The adhesively bonded regions of the rotor blade can here represent weak points in terms of mechanical resilience, wherein a damaged or, in the worst case scenario, broken rotor blade is preferably encountered at these locations.

A rotor blade part can further encompass a nose shell. As a consequence, the nose region of a rotor blade can be fabricated separately, and preferably as a single piece, wherein the adhesion regions can be configured in such a way as to make the adhesive process largely free of complications. This is the case primarily when the adhesion regions are generally free of torsions and/or undercuts.

In like manner, a rotor blade part can encompass a rear edge segment. The rear edge region can hence be fabricated separately, and preferably as a single piece, wherein the adhesion regions can be configured in such a way that adhesive bonding can take place free of complications. This is the case primarily when the adhesion regions are generally free of torsions and/or undercuts.

A further development of the rotor blade according to the invention can also provide that the nose shell and rear edge segment be joined together by a middle part segment, which essentially stretches in the direction of longitudinal extension of the rotor blade. Such an arrangement ensures that the middle part segment will absorb and convey to the flange the forces that are introduced by the nose shell and rear edge segment. The adhesion regions are here again aligned in the direction of longitudinal extension of the rotor blade, and can hence suitably distribute the stresses that arise during operation of the wind power plant over the rotor blade and introduce them into the middle part segment.

Other features which are considered as characteristic for the invention are set forth in the appended claims.

Although the invention is illustrated and described herein as embodied in a method and an adhesive machine for constructing segmented rotor blades, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE
INVENTION

Figure 1:
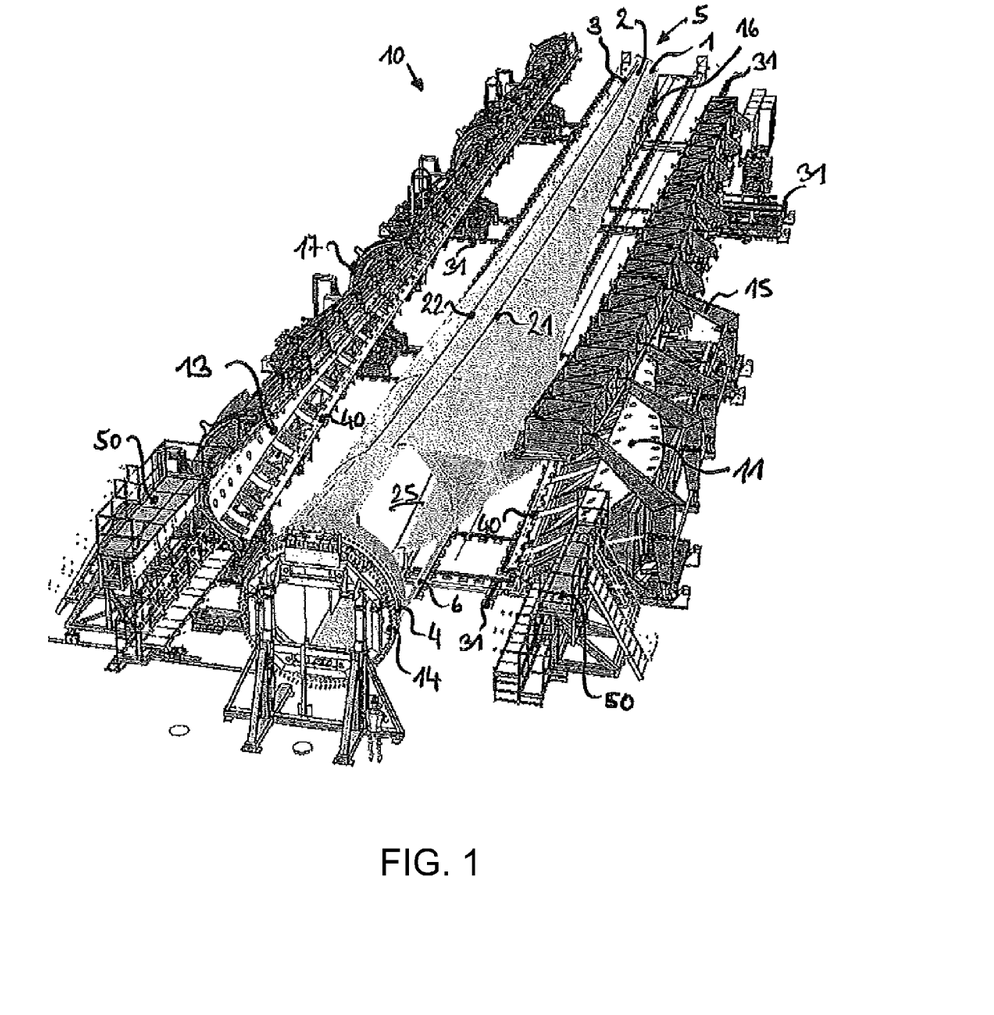
FIG. 1 is a perspective view of an embodiment of an adhesive machine or device according to the invention, which incorporates an embodiment of a rotor blade according to the invention.

Referring now to the figures of the drawings in detail and first, particularly to FIG. 1 thereof, there is shown a perspective view of an embodiment of an adhesive machine or device 10 according to the invention, which incorporates an embodiment of a rotor blade 5 according to the invention. The rotor blade 5 consists of three different rotor blade parts 1, 2 and 3. The first rotor blade part 1 is here configured as a nose shell 1, the second rotor blade part 2 as a middle part segment 2, and the third rotor blade part 3 as a rear edge segment 3. Adhesion regions 21 between the nose shell 1 and the middle part segment 2 are essentially oriented in the direction of longitudinal extension, and formed on both the suction and pressure side of the rotor blade. In a like manner, adhesion regions 22 between the rear edge segment 3 and the middle part segment 2 are essentially oriented in the direction of longitudinal extension, and formed on both the suction and pressure side of the rotor blade. Both the nose shell 1 along with the rear edge segment 3 are each joined with a flange 4 by a belt 6, which is respectively anchored in the interior of the nose shell 1 or rear edge segment 3. In addition, the flange 4 is situated in a fourth accommodating region 14. The flange 4 is arranged in this way by tightening several of the bolts provided on the flange 4. The bolting process fixes the flange 4 in place, so that the flange 4 could only be moved inadvertently, and after exposed to high mechanical forces.

In its depicted production stage, the rotor blade 5 further exhibits an opening 25, which can still ensure access to the interior of the rotor blade 5. The opening is necessary for even further processing the belts or webs inside the rotor blade 5. After processing is complete, the opening 25 is closed with a component not further depicted, wherein the outer skin of the rotor blade 5 is secured to the flange 4 on all sides. The opening 25 is closed by gluing the boundaries of the component configured as adhesion regions with the middle part segment 2 and nose shell 1 with an adhesive. In addition, a device not further depicted can be used for curing purposes by exposing the adhesive to heat.

In order to manufacture the rotor blade 5 according to the invention, a first prefabricated rotor blade part 1 (nose shell) is first placed into a first receptacle 11 of the adhesive device 10 and attached therein. The attachment is established by suitably secured aspiration ports, which enable mounting under a vacuum. In a like manner, a third prefabricated rotor blade part 3 (rear edge segment) is placed into a third receptacle 13 of the adhesive device 10 and attached therein. The attachment is again established through vacuum-assisted mounting.

When inserting both the first prefabricated rotor blade part 1 and the third prefabricated rotor blade part 3, care is taken during the fitting process to maintain a predetermined alignment and the required accuracy. To assist in the fitting process, the receptacles 11 and 13 exhibit inserts, which correspond to the geometric circumferential shape of the rotor blade parts 1 and 3, thereby helping to bring about a perfect fit during placement. The inserts are each secured to a first retaining structure 15 and a third retaining structure 17.

The retaining structures 15 and 17 are each braced against the ground on a set of rails 31, and can be moved toward or away from each other thereon.

Situated at roughly the midpoint between the two retaining structures 15 and 17 is another second retaining structure 16, upon which is also provided a second accommodating region 12, which is not further depicted or visible. The second accommodating region 12 is used to receive the second prefabricated rotor blade part 2, which is configured as a middle part segment 2 situated between the nose shell 1 and rear edge segment 3 in the rotor blade 5 depicted.

In order to manufacture the rotor blade 5, the first retaining structure 15 with the first rotor blade part 1 (nose shell) received in the first accommodating region 11 provided therein and the third retaining structure 17 with the third rotor blade part 3 (rear edge segment) received in the third accommodating region 13 provided therein are now moved relatively toward each other, i.e., both are moved toward the second rotor blade part 2 received in the second accommodating region 12. Therefore, the second accommodating region 12 as well as the second rotor blade part 2 incorporated therein remain spatially fixed in place, just as the flange 4. The movement continues until such time as the adhesion regions 21 of the nose shell 1 and the adhesion regions 21 of the middle part segment 2 have established sufficient contact with each other. The adhesive applied to the adhesion regions 21 can here prevent direct and immediate contact. In any case, however, the two components approach each other closely enough to bring about an adhesive bond via the adhesive.

In a like manner, the movement takes place in such a way that the adhesion regions 22 of the rear edge segment 3 and middle part segment 2 come into sufficient contact with each other. Direct and immediate contact can here again be avoided by the adhesive applied to the adhesion regions 22. In any case, however, the two components approach each other closely enough to bring about an adhesive bond.

The movement of the first retaining structure 15 and the third retaining structure 17 can be simultaneous or staggered in terms of time.

Once the adhesion position has been reached, thermal energy is supplied in a localized manner along the two adhesion regions 21 and 22 by tempering devices 40, which each are provided in the first accommodating region 11 and the third accommodating region 13. The tempering devices 40 are here arranged and geometrically configured in such a way that essentially only the adhesion regions 21 and 22 are supplied with thermal energy. This leads to a targeted curing of the as yet uncured adhesive in the adhesion regions 21 and 22, thereby rigidly joining together the first rotor blade part 1 (nose shell), second rotor blade part 2 (middle part segment), and third rotor blade part 3 (rear edge segment).

Joining with the flange 4 likewise takes place with the first rotor blade part 1 (nose shell), second rotor blade part 2 (middle part segment) and third rotor blade part 3 (rear edge segment), wherein the adhesive is here cured in the adhesion regions not further provided with reference numbers by a tempering device not further shown.

According to the embodiment, the belt ends 6 on the side of the first rotor blade part 1 and the third rotor blade part 3 are joined by respective laterally arranged pressing units 50, which can likewise be moved on rails in the direction toward the flange 4. After a sufficient convergence, preformed surfaces press against the belt ends 6, which are adhesively bonded with the flange, and thereby cause the belt ends 6 to press against predetermined regions on the flange 4. Curing can take place on these regions through exposure to heat. A tempering device can again be provided on or in the pressing regions for this purpose.

The movement by both the pressing units 50 as well as the first retaining structure 15 and third retaining structure 17 can be course-controlled and individually actuated.

Figure 2:
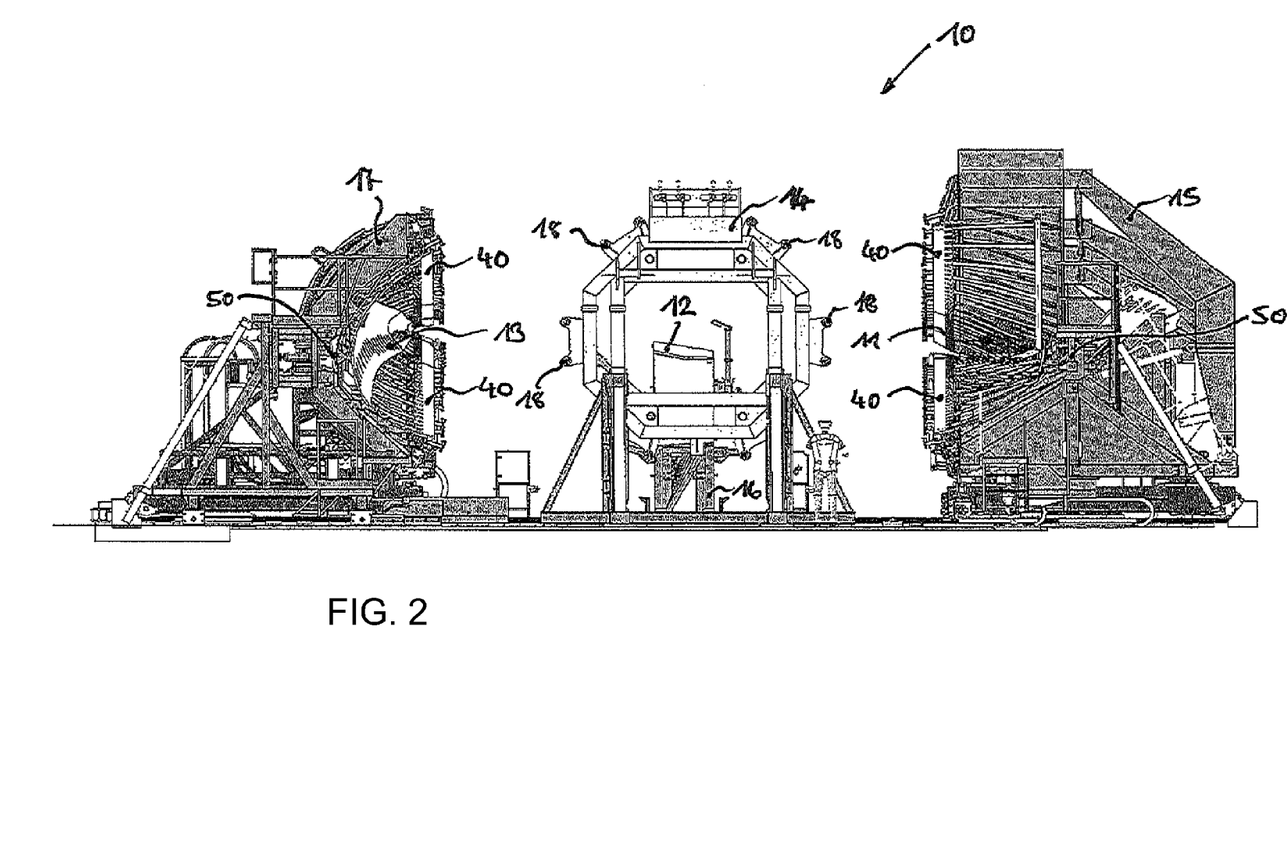
FIG. 2 is a side view of the embodiment of the adhesive device according to the invention as depicted on FIG. 1, which incorporates no rotor blade.

FIG. 2 shows a side view of the embodiment of the adhesive device 10 according to the invention as depicted on FIG. 1, which incorporates no rotor blade. The fourth accommodating region 14 is clearly shown, and provided for retaining the flange 4. The flange 4 is here held in place by several bolts of the bolt collar, which are accommodated by bolt receptacles 18. According to the embodiment, the bolt receptacles 18 are configured as bushings 18, through which the bolts are guided and tightened on the opposite side.

Also clearly evident is the second accommodating region 12, which itself is placed on the second retaining structure 16 (the second accommodating region 12 as well as the second retaining structure 16, which are both situated in the image plane behind the fourth accommodating region 14, are foreshortened).

Figure 3:
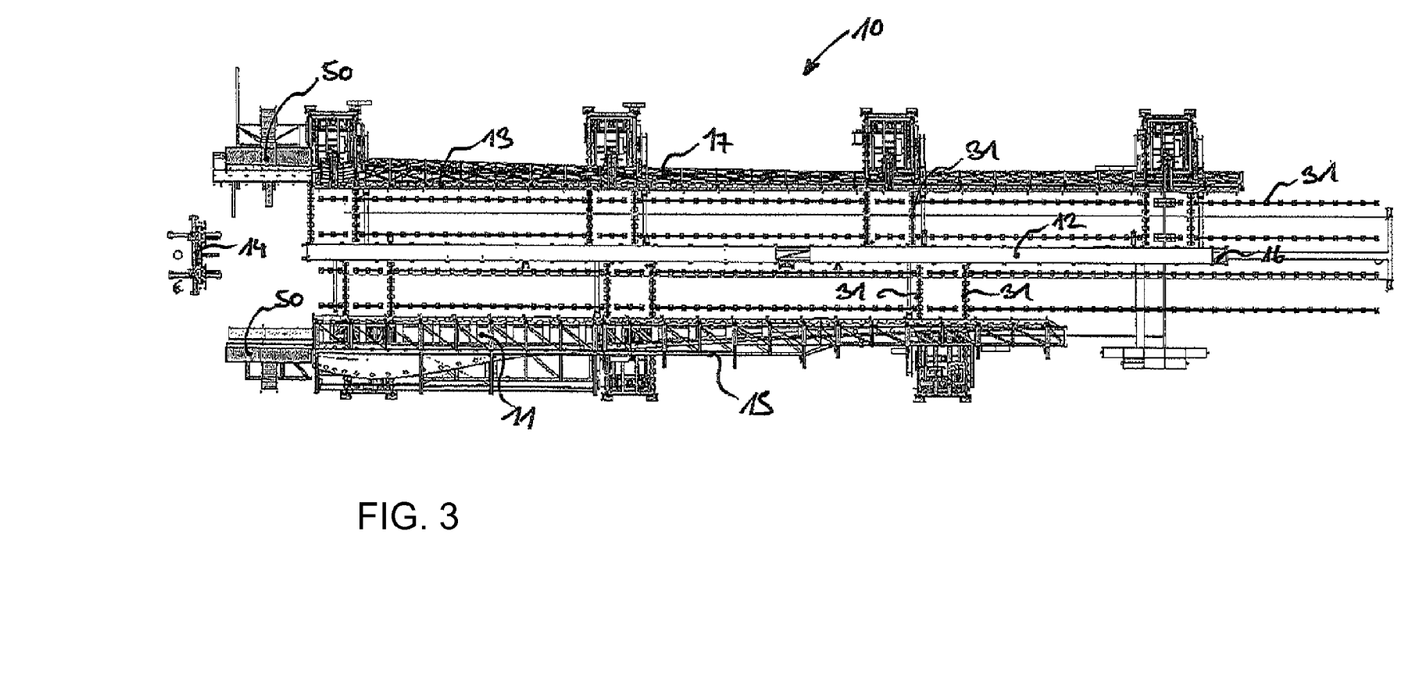
FIG. 3 is a top plan view of the embodiment of the adhesive device according to the invention as depicted on the preceding figures, which incorporates no rotor blade.

FIG. 3 shows a perspective top view of the embodiment of the adhesive device 10 according to the invention as depicted on the preceding figures, which incorporates no rotor blade 5. Distinctly visible in the depiction is the first retaining structure 15, which exhibits the first accommodating region 11 for receiving the first rotor blade 1 (nose shell) (not shown). Further discernible is the third retaining structure 17, which exhibits the third accommodating region 13 for receiving the third rotor blade part 3 (rear edge segment) (not shown). Both retaining structures 15 and 17 are each arranged on one side of the second accommodating region 12, which is secured to the second retaining structure 16.

Figure 5:
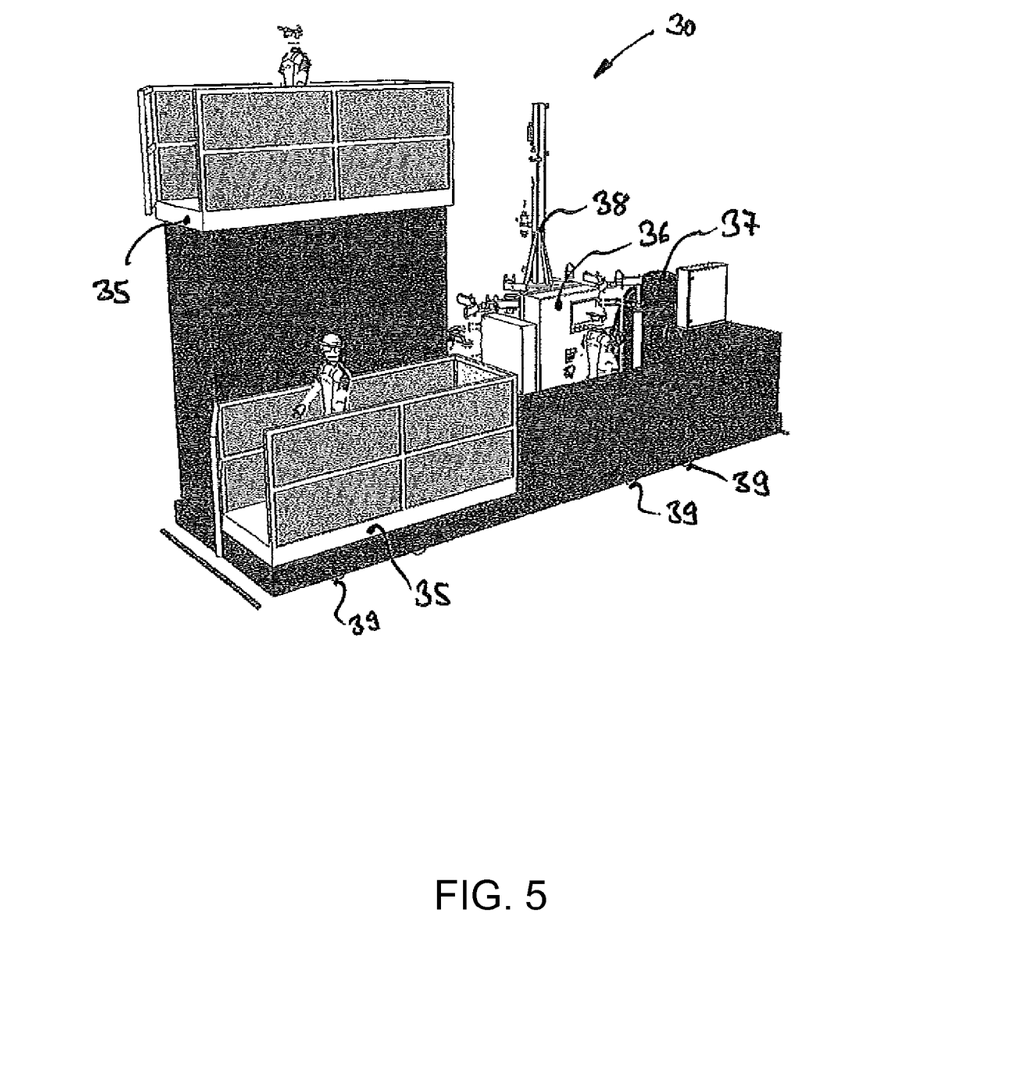
FIG. 5 is a perspective view of an adhesive apparatus of an embodiment not further depicted of the adhesive device shown on the preceding figures.

Furthermore, a pair of rails 31 arranged parallel to each other run both on the side of the first retaining structure 15 and on the side of the third retaining structure 17, and are provided for a respective adhesive apparatus 30 (see also FIG. 5). Such adhesive apparatuses can be shifted along these rails 31, so that all adhesion regions 21 and 22 of the rotor blade parts 1, 2 and 3 not further depicted can be supplied and provided with adhesive. The rails 31 here essentially run parallel to the longitudinal extension of the second accommodating region 12.

Also shown on FIG. 3 on the side of the first retaining structure 15 is a set comprised of three pairs of parallel running rails 31. The latter allow the first retaining structure 15 to move in the direction toward the second accommodating region 12. In addition, a set comprised of four pairs of parallel running rails 31 is arranged on the side of the third retaining structure 17. These allow the third retaining structure 17 to also move in the direction toward the second accommodating region 12. These rail pairs are arranged so as to run essentially perpendicular to the rails 31, which are provided for the adhesive apparatus.

Figure 4:
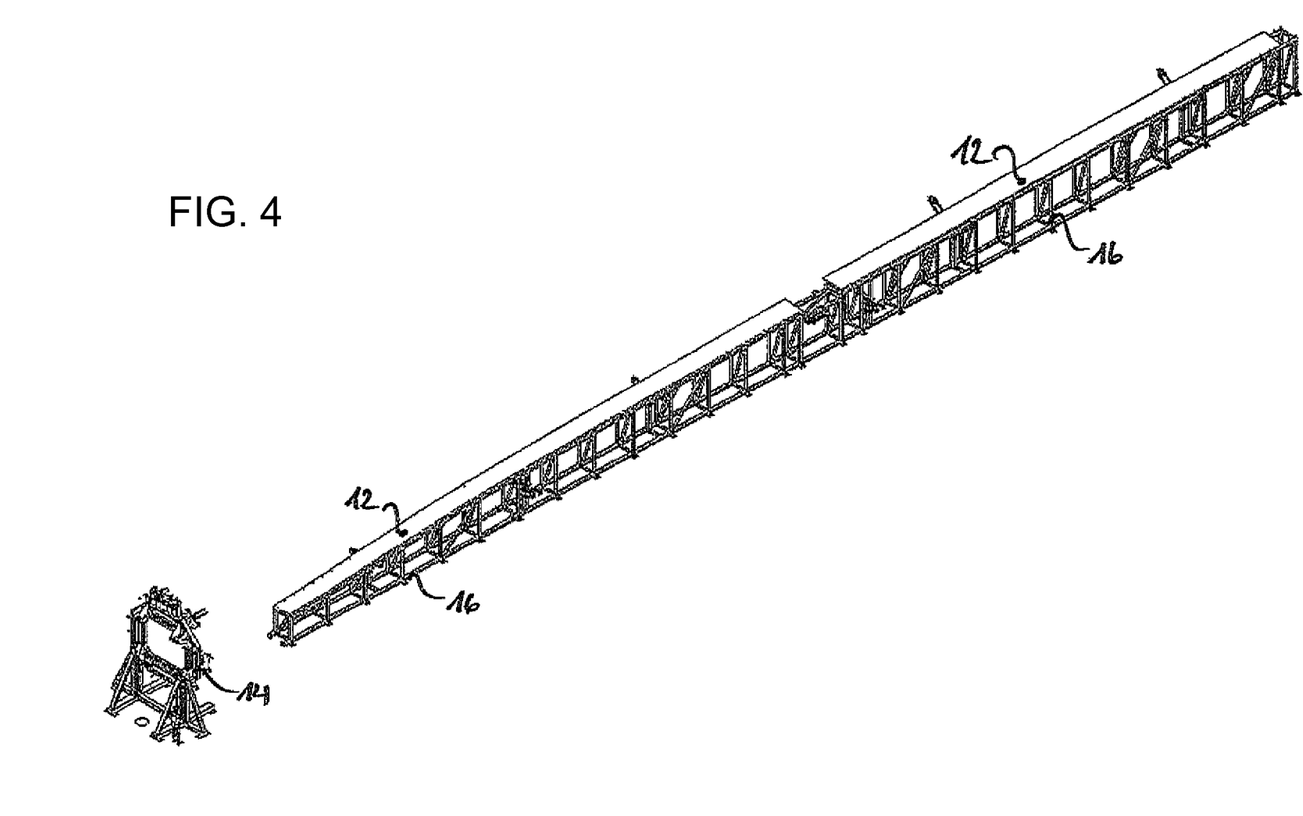
FIG. 4 is a perspective view of a second accommodating region for receiving a middle part segment of an embodiment of the rotor blade according to the invention corresponding to the embodiment of the adhesive device depicted on the preceding figures.

FIG. 4 shows a perspective view of the second accommodating region 12 for receiving a middle part segment of an embodiment of the rotor blade 5 according to the invention (not shown) based on the embodiment of the adhesive device 10 depicted on the preceding figures. The second accommodating region 12 is here comprised of two parts, and is held by the second retaining structure 16. The fourth accommodating region 14 for mounting the flange 4 is provided at the end, elongating the direction of longitudinal extension of the second accommodating region 12.

The second accommodating region 12 is interrupted in roughly the middle of its longitudinal extension, and exhibits a recess. This recess can be advantageous for adjustment purposes if it exhibits adjustment aids, which are not shown here.

FIG. 5 presents a perspective view of an adhesive apparatus 30 of an embodiment (not further depicted) of the adhesive device 10 shown on the preceding figures. The adhesive device 10 is suitable for accommodating several people (three individuals here), who can work on respectively different planes. The adhesive apparatus 30 exhibits two personal platforms 35, which can be vertically moved (corresponding to the orientation shown). Individuals can be equipped with hoses (not depicted here), which are suitable for applying and metering adhesive (for example, commercially available epoxy adhesive). To this end, the hoses can also exhibit suitable discharge nozzles, from which the adhesive is dispensed.

On the other side of the hose, the hoses empty into a dispensing unit 36, which is provided with a suitable control. The dispensing unit 36 interacts with a non-illustrated pump, which distributes the provided adhesive on the hoses. From the dispensing unit 36, the hoses each branch off toward the top (corresponding to the present orientation), and are mounted on a hose bracket 38 for purposes of stress relief. The adhesive is taken from a storage container 37.

For locomotion purposes, the adhesive apparatus 30 is made to abut against rails 31 (not further shown) by rail rollers 39, and can be autonomously moved on the latter by a suitable non-illustrated driving device.

Additional embodiments may be derived from the subclaims. Let it further be noted that all features shown on the figures are here being claimed, whether in isolation or in conjunction with each other.

The invention claimed is:

1. An adhesive machine for constructing segmented rotor blades each having at least three prefabricated rotor blade parts, the adhesive machine comprising:
   accommodating regions, including:
      a first accommodating region for receiving a first prefabricated rotor blade part;
      a second accommodating region for receiving a second prefabricated rotor blade part; and
      a third accommodating region for receiving a third prefabricated rotor blade part, said first accommodating region, said second accommodating region and said third accommodating region being movable relative to each other in such a way that, after the three prefabricated rotor blade parts have been received in respective ones of said accommodating regions in an open position of the adhesive machine, the prefabricated rotor blade parts are brought into direct or indirect contact with each other along predetermined adhesion regions, and thus transferred into an adhesion position, said first accommodating region and said third accommodating region being movable toward one another and toward the second accommodating region while the second accommodating region remains spatially fixed in place, said second accommodating region being disposed between said first accommodating region and said third accommodating region.

2. The adhesive machine according to claim 1, further comprising at least one additional, fourth accommodating region, configured to receive or mount a flange, which can be adhesively bonded with at least one of the three prefabricated rotor blade parts over a predetermined adhesion region.

3. The adhesive machine according to claim 2, wherein at least one of said first, second, third and fourth accommodating regions can be tilted relative to one other one of said accommodating regions while transferring the prefabricated rotor blade parts situated in said accommodating regions into the adhesion position.

4. The adhesive machine according to claim 1, wherein said first accommodating region, said second accommodating region and said third accommodating region execute a movement relative to each other that is perpendicular to a progression of a gravitational field while transferring the prefabricated rotor blade parts situated in said three accommodating regions into the adhesion position.

5. The adhesive machine according to claim 1, wherein at least one of said three accommodating regions is pivotable in design.

6. The adhesive machine according to claim 2, wherein at least one of said accommodating regions can be adjusted to a geometric shape of the prefabricated rotor blade part or the flange provided as intended for accommodation.

7. The adhesive machine according to claim 1, wherein at least one of said first, second or third accommodating regions of the adhesive machine exhibit a longitudinal extension, which is generally oriented parallel to a longitudinal extension of a rotor blade to be constructed.

8. The adhesive machine according to claim 1, further comprising an adhesive apparatus, which can at least sectionally move along the predetermined adhesion regions, in particular perpendicular to a directional progression of earth's magnetic field along the predetermined adhesion regions.

9. The adhesive machine according to claim 2, further comprising at least one tempering device configured to expose the predetermined adhesion regions of at least one of the prefabricated rotor blade parts or the flange to heat on a locally limited basis.

10. The adhesive machine according to claim 2, further comprising at least one pressing unit configured to be able to press at least one end of the prefabricated rotor blade parts against the flange for purposes of adhesive bonding.

11. The adhesive machine according to claim 1, further comprising at least one suction unit for retaining at least one of the prefabricated rotor blade parts in a respective one of said accommodating regions under a vacuum.

12. The adhesive machine according to claim 1, wherein at least one of said three accommodating regions is pivotable in design and can pivot by at least 90°.

13. A method for adhesively bonding several prefabricated rotor blade parts for constructing a segmented rotor blade, which comprises the steps of:
adhesively bonding the prefabricated rotor blade parts by means of an adhesive machine according to claim 1, such that at least one of the prefabricated rotor blade parts are accommodated by the adhesive machine, and brought into direct or indirect contact with another of the prefabricated rotor blade parts along predetermined adhesion regions so as to be adhesively bonded in an adhesion position.

14. The method according to claim 13, wherein the three prefabricated rotor blade parts are accommodated by the adhesive machine.

15. The adhesive machine according to claim 1, wherein at least one of said first, second, third accommodating regions can be tilted relative to one other one of said accommodating regions while transferring the prefabricated rotor blade parts situated in said accommodating regions into the adhesion position.

16. The adhesive machine according to claim 1, wherein at least one of said accommodating regions can be adjusted to a geometric shape of the prefabricated rotor blade part or the flange provided as intended for accommodation.

17. The adhesive machine according to claim 1, further comprising at least one tempering device configured to expose the predetermined adhesion regions of at least one of the prefabricated rotor blade parts or the flange to heat on a locally limited basis.

18. The adhesive machine according to claim 1, further comprising at least one pressing unit configured to be able to press at least one end of the prefabricated rotor blade parts against the flange for purposes of adhesive bonding.

* * * * *

UNITED STATES PATENT AND TRADEMARK OFFICE
CERTIFICATE OF CORRECTION

PATENT NO.       : 9,689,371 B2
APPLICATION NO.  : 14/148934
DATED            : January 7, 2014
INVENTOR(S)      : Kai Daenekas et al.

It is certified that error appears in the above-identified patent and that said Letters Patent is hereby corrected as shown below:

On the Title Page (73) Assignee should read: Carbon Rotec GmbH & Co. KG, Lemwerder (DE)

Signed and Sealed this
First Day of May, 2018

Andrei Iancu
*Director of the United States Patent and Trademark Office*